United States Patent Office 3,259,540
Patented July 5, 1966

3,259,540
STABILIZED INSECTICIDAL COMPOSITION CONTAINING AN O,O-DIMETHYL S-(N-ALKOXYMETHYL) CARBAMOYLMETHYL PHOSPHOROTHIOLOTHIONATE
Max Pianka and Donald John Polton, St. Albans, England, assignors to The Murphy Chemical Company Limited, St. Albans, England, a British company
No Drawing. Filed Feb. 13, 1961, Ser. No. 88,646
2 Claims. (Cl. 167—22)

This invention is concerned with new chemical compounds having useful insecticidal and acaricidal properties and to preparations containing them.

The new compounds according to the invention have the general formula:

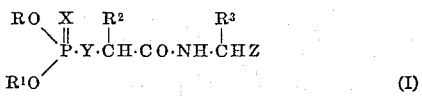

(I)

in which

X or Y is a sulphur or an oxygen atom, at least one of them being a sulphur atom;

R and $R^1$ are the same or are different and each is an alkyl group containing 1–4 carbon atoms;

$R^2$ is a hydrogen atom or an alkyl or substituted alkyl group, preferably containing 1–8 carbon atoms;

$R^3$ is a hydrogen atom or an alkyl or substituted alkyl group, preferably containing 1–8 carbon atoms and Z is one of the following groups:

(i) A hydroxyl group when $R^2$ or $R^3$ is an alkyl or substituted alkyl group and X and Y are different;
(ii) The group $OR^4$, in which $R^4$ is an alkyl or substituted alkyl group, an alkenyl or substituted alkenyl group, an alkyl group interrupted in the chain by e.g. an oxygen or a sulphur atom or a carbonyl group, an aryl or substituted aryl group, an aralkyl or substituted aralkyl group, an alicyclic group, a heterocyclic or substituted heterocyclic group or an acyl group;
(iii) A dithiocarbamoyl or substituted dithiocarbamoyl group;
(iv) A xanthyl group i.e. the group —S.C(S)OC$_2$H$_5$ or an ethoxythiocarbonyl group i.e. the group

—S.C(O)OC$_2$H$_5$ or (v) $NR^5R^6$, where $R^5$ is a hydrogen atom, an alkyl or substituted alkyl group, an aralkyl or substituted aralkyl group or an alicyclic group and $R^6$ is an alkyl or substituted alkyl group, an aralkyl or substituted aralkyl group or an alicyclic group or $NR^5R^6$ together form the residue of a heterocyclic ring;

together with acid addition and quaternary ammonium salts thereof.

The compounds according to the invention possess, in general, improved contact insecticidal properties over the corresponding unsubstituted N-methylol compounds. Moreover many of the new compounds are oils and can readily be formulated for horticultural and agricultural application and a large number of them possess a high degree of water-solubility which aids systemic activity in plants. A further advantage of the compounds according to the invention is that they can, in general, be readily prepared in good yields from readily available raw materials.

It should be noted that in these compounds according to the invention in which X and Y are different i.e. one is a sulphur atom and the other is an oxygen atom, isomerisation may occur during their preparation or on standing.

In the above general Formula I the groups R and $R^1$ may be methyl, ethyl; n-propyl, isopropyl or butyl.

$R^2$ is preferably hydrogen but may be methyl, ethyl, n-propyl, isopropyl, butyl, n-hexyl, etc.

$R^3$ is preferably hydrogen but may be an alkyl or substituted alkyl group containing 1–8 carbon atoms, e.g. methyl, ethyl, n-propyl, isopropyl, butyl, n-hexyl, etc. or a chloro- or bromo- substituted alkyl group e.g. trichloromethyl or tribromomethyl etc.

Z may be a hydroxyl group (in the circumstances defined above) but may also be, as set out above, a substituted hydroxyl group. Where $R^4$ is an alkyl group it may contain 1–8 carbon atoms but preferably contains 1–4 carbon atoms e.g. it may be methyl, ethyl, n-propyl, isopropyl, n-butyl etc. Where $R^4$ is an alkenyl group it may contain 2–8 carbon atoms e.g. it may be allyl. $R^4$ may also be phenyl, chorophenyl, benzyl or naphthyl.

Compounds according to the invention in which Z is a dithiocarbamoyl or substituted dithiocarbamoyl group are important in that these compounds in addition to being active against insects and acarids also possess activity against common plant fungal pathogens, e.g. Venturia inaequalis. These compounds preferably have the formula:

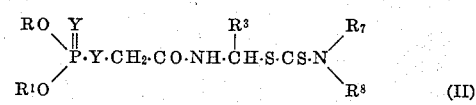

(II)

where R, $R^1$, X and Y have the above defined meanings, $R^3$ is a hydrogen atom or an alkyl or substituted alkyl group containing 1–4 carbon atoms, e.g. methyl, ethyl, trichloromethyl, tribromomethyl etc., $R^7$ is a hydrogen atom or an alkyl group containing 1–4 carbon atoms and $R^8$ is an alkyl group containing 1–4 carbon atoms.

An important example of a compound of Formula II is O,O-dimethyl S-[N-(1-dimethyldithiocarbamoyl-2:2:2-trichloro)ethyl] carbamoylmethyl phosphorothiolothionate. This compound has good insecticidal properties and is also very active against Venturia inaequalis.

A further group of compounds according to the invention which are of particular interest are those having the general formula:

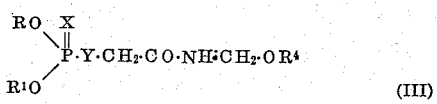

(III)

where R, $R^1$, X and Y have the above defined meanings for general Formula I and $R^4$, in this instance, is an alkyl group containing 1–4 carbon atoms. Preferably R, $R^1$ and $R^4$ are methyl or ethyl groups. Thus, two compounds of general Formula III which have insecticidal action coupled with low mammalian toxicity are:

(a) O,O - dimethyl S - (N - methoxymethyl) carbamoylmethyl phosphorothiolothionate.
(b) O,O - dimethyl S - (N - ethoxymethyl) carbamoylmethyl phosphorothiolothionate.

Both compounds, in addition to their contact insecticidal properties, have pronounced systemic properties. They have been found to penetrate into the roots and leaves of various plants and kill sucking insects and mites.

Further compounds of general Formula III which are of interest are:

(c) O,O-diethyl S-(N-methoxymethyl) carbamoylmethyl phosphorothiolothionate.
(d) O,O-diethyl S-(N-ethoxymethyl) carbamoylmethyl phosphorothiolothionate.
(e) O,O-diethyl O-(N-methoxymethyl) carbamoylmethyl phosphorothionate and
(f) O,O-diethyl O-(N-ethoxymethyl) carbamoylmethyl phosphorothionate.

These compounds have a high contact insecticidal and systemic activities and are very persistent but are rather more toxic than compounds (a) and (b).

Unfortunately certain of the compounds according to the invention are not very stable and hence lose their biological activity on standing or on exposure to slightly elevated temperature conditions, such as those encountered during the summer months in England, although the compounds in question have favourable mammalian toxicities and excellent contact and systemic insecticidal activities. These compounds may be represented by the general formula:

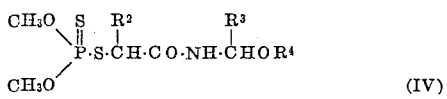

where $R^2$, $R^3$ and $R^4$ have the meanings defined above for general Formula I.

Examples of these substances are:

(a) O,O-dimethyl S-(N-methoxymethyl) carbamoylmethyl phosphorothiolothionate (referred to herein as Compound A)

$(CH_3O)_2P(S)SCH_2CONHCH_2OCH_3$ and (b) O,O-dimethyl S-(N-ethoxymethyl) carbamoylmethyl phosphorothiolothionate (referred to herein as Compound B)

$(CH_3O)_2P(S)SCH_2CONHCH_2OC_2H_5$

It has now been found that the stability of compounds of the above general Formula IV may be improved by admixing acid binding agents therewith. Whilst we are unable to explain the reason for this, the pest control agents develop acidity on standing in the absence of said binding agent and the acid binding agents serve to inhibit the formation of acidic by-products rather than to absorb any acid. Since it is known that many organophosphorus compounds undergo decomposition when mixed with basic materials, particularly if the mixtures are kept at elevated temperature, the result is somewhat unexpected.

According to a feature of the invention, therefore, there is provided a pesticidal composition of improved stability comprising a compound of the above general Formula IV in admixture with an acid binding agent.

While the acid binding agent may be inorganic, e.g. ammonia, it is preferably organic in order that it may be formulated in a miscible composition. Thus, for example, in order to prepare sprays one may first wish to dissolve the pest control agent in an organic solvent and in order to obtain intimate contact between the pest control agent and the acid binding agent, the latter is preferably soluble in the chosen solvent.

Acid binding agents which may be used include organic compounds containing epoxy groups e.g. epichlorohydrin, glycidyl ethers, e.g. phenyl glycidyl ether, and epoxidised fatty acids. Other acid binding agents include organic bases, particularly fairly strong bases. Thus, for example, while pyridine, i.e. a fairly weak base, may be used it is not so effective as a polyamine e.g. ethylene diamine which is, of course, a much stronger base.

These pesticidal compositions of improved stability are preferably formulated as a solution in an alkanol e.g. methanol or butanol, since the use of such a solvent also assists in improving the stability of the pest control agent for reasons which are not understood. Thus, while the agent on standing by itself at 15° C. for several months may lose its activity, under otherwise identical conditions but dissolved in an alkanol the activity is maintained for several months. However, when such a solution is kept at elevated (i.e. summer) temperature, deterioration in activity may be noted.

In testing the improved stability obtained by the addition of an acid binding agent to a solution of compound A the following procedure was used: 50 g. of compound A were mixed with 1 gm. of the acid binding agent and the mixture dissolved in butanol to a volume of 100 cc. Where no acid binding agent was used 50 g. of compound A were dissolved in butanol to a volume of 100 cc. The mixtures were stored at 37° C. for six weeks and diluted with water to the required concentrations. Broad beans infested with aphids (*Aphis fabae*) were dipped in the mixtures. Observations of kill were made after 48 hours and the following results noted:

| When tested | Solvent product | Acid Binding Agent | Percent Kill of aphids | | |
|---|---|---|---|---|---|
| | | | 25 p.p.m. | 10 p.p.m. | 5 p.p.m. |
| Before storage | Yes | None | 99 | 78 | 15 |
| After storage | Yes | do | 60 | 23 | 4 |
| Do | No [1] | do | 3 | 4 | 1 |
| Do | Yes | Ethylene diamine | 97 | 86 | 34 |
| Do | Yes | Triethanolamine | 100 | 39 | 18 |
| Do | Yes | Epichlorohydrin | 97 | 72 | 52 |

[1] Compound was stored in the absence of solvent but solvent was added just before testing.

Allowing for experimental errors inherent in biological testing, it is evident that in the presence of the acid binding agents and solvents, the biological activity of Compound A had not suffered when the mixtures were stored at 37° C. for six weeks. Similar results were obtained on testing Compound B in like circumstances.

The compounds according to the invention may be prepared in any desired way. In one convenient method of preparation a compound of the general formula:

(where R, $R^1$, X and Y have the meanings defined for general Formula I and M is a hydrogen or an alkali metal atom or an ammonium group) is reacted with a compound of the general formula:

$$A—CHR^2·CONH·CHR^3·Z \qquad (VI)$$

(where $R^2$, $R^3$ and Z have the meanings defined for general Formula I and A is a chlorine, bromine or iodine atom), the reaction being carried out in the presence of an acid binding agent where M is a hydrogen atom.

Suitable acid binding agents are, for example, alkali metal carbonate, such as sodium or potassium carbonate and tertiary bases, such as pyridine and triethylamine.

The reaction may be carried out in the presence of a solvent and suitable solvents are water, ketones, e.g. acetone, methylethylketone, methylisobutylketone and dioxan, alcohols, e.g. methanol, ethanol and isopropanol, ethers, e.g. diethyl ether and diisopropyl ether, hydrocarbon solvents, e.g. petroleum ether, benzene and toluene, halogenated hydrocarbon solvents, e.g. chloroform, carbon tetrachloride, methylene dichloride and chlorobenzene.

Alternatively, one can treat compounds of the general formula:

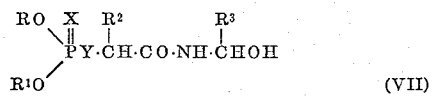

(VII)

so as to replace the OH group by the group Z (where Z has the meaning defined for Formula I but is other than a hydroxyl group). This method is useful, for example, for the preparation of compounds in which Z is an alkoxy group. Thus, one can react a compound of Formula VII with an alkanol or other alkylating agent to form the desired ether.

Compounds of Formula VII may be prepared by reacting a compound of the general Formula V with a compound of the general formula:

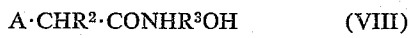

where A, $R^2$ and $R^3$ have the above defined meanings for compounds of Formula VI, the reaction being carried out in the presence of an acid binding agent when M is a hydogren atom. Acid binding agents and solvents similar to those which may be used for the reaction of compounds of Formula V with compounds of Formula VI may be used for this reaction also.

The compounds according to the invention can be formulated for use in any desired way. Generally such formulations will include the pesticidal compound or toxicant in association with a suitable carrier or diluent. Such carriers may be liquid or solid and designed to aid the application of the toxicant either by way of dispersing it where it is to be applied or to provide a formulation which can be made by the user into a dispersible preparation.

Liquid preparations thus particularly include preparations of the toxicant in the form of solutions or emulsions which can be used on their own or be adapted to be made up with water or other diluents to form sprays etc.; in such cases the carrier is a solvent or emulsion base non-phytotoxic under the conditions of use. Generally such preparations will include a wetting, dispersing or emulsifying agent. Other liquid preparations include aerosols in which the toxicant is associated with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included. Solid preparations also include thermal fumigating devices wherein the toxicant is associated with a solid pyrotechnic component.

In order that the invention may be well understood the following examples are given by way of illustration only:

EXAMPLE 1

*O,O-diethyl S-(N-methoxymethyl) carbamoylmethyl phosphorothiolothionate*

$(C_2H_5O)_2P(S)S \cdot CH_2CONHCH_2OCH_3$—prepared in situ via O,O-diethyl S-(N-hydroxymethyl) carbamoylmethyl phosphorothiolothionate A mixture of 22.4 g. of O,O-diethyl potassium phosphorothiolothionate and 12.35 g. of N-methylol α-chloroacetamide in 150 cc. of methanol was refluxed for 2 hours. After cooling, the precipitated potassium chloride was filtered off. To the resulting solution of O,O-diethyl S-(N-hydroxymethyl) carbamoylmethyl phosphorothiolothionate, 2cc. of concentrated hydrocholoric acid (36%) were added and the solution set aside at room temperature for 16 hours. The mixture was then neutralised with sodium bicarbonate and the solvent removed under reduced pressure. Chloroform was added to the residue, the solid salts were filtered off, and the solvent removed from the filtrate. A chlorine-free oil was obtained weighing 27.9 g. (theory requires 27.7 g.), $n_D^{20}$ 1.5269.

This compound was formulated as follows:
20 parts by weight of the toxicant and 30 parts by weight of Lissapol NX were made up to 100 parts by volume with methanol and diluted with water to contain 0.001% of the compound. Dwarf beans infested with Greenhouse Red Spider were dipped in this mixture and observations were made after 48 hours when it was found that all the spiders were dead.

A dilution of 0.001% of the toxicant gave 100% kill of aphids on broad beans in a parallel test.

Moreover the compound had very pronounced systemic properties in that it penetrated into the roots and leaves of plants and killed sucking insects and mites.

EXAMPLE 2

*O,O-diethyl-S-(N-methoxymethyl) carbamoylmethyl phosphorothiolothionate*

(Prepared from N-methoxymethyl α-chloroacetamide in situ)

6.17 g. of N-methylol α-chloroacetamide were dissolved in 40 cc. of methanol and to the solution were added 2.5 cc. of conc. hydrochloric acid. The solution was set aside for 16 hours at room temperature, then neutralised with sodium bicarbonate. The solvents were then removed from the mixture. Acetone was added to the residue and the solid removed by filtration. To the filtrate 11.2 g. of O,O-diethyl potassium phosphorothiolothionate were added. The mixture was allowed to stand at room temperature and the precipitated potassium chloride filtered off. The acetone was then removed leaving a yellow oil free from chlorine and weighing 13.9 g. (theory requires 14.35 g.) $n_D^{20}$ 1.5267.

EXAMPLE 3

*O,O-diethyl-S-(N-methoxymethyl) carbamoylmethyl phosphorothiolothionate*

(Prepared from isolated N-methoxymethyl α-chloroacetamide)

10 g. of N-methylol α-chloroacetamide were dissolved in a mixture of 60 cc. of methanol and 2 cc. of concentrated hydrochloric acid. The mixture was set aside for 18 hours at room temperature, neutralised with sodium bicarbonate (8.6 g.), filtered, and the oil distilled. The fraction boiling at 108°/6 mm. pressure was collected to yield 4.1 g. (36.8% of theory) of N-methoxymethyl α-chloroacetamide; $n_D^{24}$ 1.4738 (Found: Cl, 26.21. $C_4H_8O_2NCl$ requires Cl, 25.8%). The oil solidified on cooling.

A solution of 1.37 g. of N-methoxymethyl α-chloroacetamide in 5 cc. of acetone was mixed with a solution of 2.24 g. of O,O-diethyl potassium phosphorothiolothionate in 15 cc. or acetone. The mixture was allowed to stand for 2 days at room temperature and the precipitated potassium chloride filtered off. The acetone was distilled off from the filtrate to yield a pale yellow chlorine-free oil weighing 2.8 g. (theory requires 2.87 g.) $n_D^{20}$ 1.5262 (Found: P, 10.5; N, 4.4. $C_8H_{18}O_4NPS_2$ requires P, 10.8; N, 4.9%).

EXAMPLE 4

*O,O-diethyl S-(N-n-butoxymethyl) carbamoylmethyl phosphorothiolothionate*

$(C_2H_5O)_2P(S) SCH_2CONHCH_2OC_4H_9$ 12.35 g. of methylol chloroacetamide were shaken with 50 cc. of n-butanol and 2 cc. of concentrated hydrochloric acid until all the solid had dissolved (3 hours) and the solution allowed to stand overnight. Sodium carbonate was added to neutralise the hydrochloric acid and the solution was filtered.

To the filtrate was added a solution of 22.4 g. of diethyl potassium phosphorothiolothionate in 100 cc. of acetone. The mixture was allowed to stand for 16 hours and the precipitated potassium chloride was filtered off. After removal of the solvents at a pressure of 20 mm., then at a pressure of 1 mm. and a temperature of 70° C., O,O-diethyl S-(N-n-butoxymethyl) carbamoylmethyl phosphorothiolothionate remained as a yellow oil $n_D^{20}$ 1.5200.

The compounds in Examples 5–9 were prepared in a similar way.

EXAMPLE 5

*O,O-diethyl S-[N-(2-methyl-4-oxo-2-pentyloxymethyl)] carbamoylmethyl phosphorothiolothionate*

$(C_2H_5O)_2P(S)S—CH_2CONHCH_2OC(CH_3)_2COCH_3$ (from diacetone alcohol) $n_D^{20}$ 1.5455.

EXAMPLE 6

O,O-diethyl S-(N-2-ethylthioethoxymethyl) carbamoylmethyl phosphorothiolothionate was prepared using β-hydroxyethyl ethyl sulphide. The compound had $n_D^{20}$ 1.5392.

EXAMPLE 7

*O,O-diethyl S-(N-ethoxymethyl) carbamoylmethyl phosphorothiolothionate*

$(C_2H_5O)_2P(S)SCH_2CONHCH_2OC_2H_5$

N-ethoxymethyl α-chloroacetamide was prepared as in Example 3 but using ethanol instead of methanol. It was a colourless liquid with a refractive index of $n_D^{20}$ 1.4712 (Found: Cl, 23.1. $C_5H_{10}ClNO_2$ requires Cl, 23.4%). O,O-diethyl S-(N-ethoxymethyl) carbamoylmethyl phosphorothiolothionate was prepared as in Example 3. It was a colourless oil, $n_D^{20}$ 1.5189.

EXAMPLE 8

*O,O-diethyl S-(N-allyloxymethyl) carbamoylmethyl phosphorothiolothionate*

$(C_2H_5O)_2P(S)SCH_2CONHCH_2OCH_2—CH=CH_2$

N-allyloxymethyl α-chloroacetamide was prepared as in Example 3, but using allyl alcohol instead of methanol. It was a pale yellow liquid with a refractive index of $n_D^{20}$ 1.4850 (Found: Cl, 21.8. $C_6H_{11}ClNO_2$ requires Cl, 21.7%). O,O-diethyl S-(N-allyloxymethyl) carbamoylmethyl phosphorothiolothionate was prepared as in Example 4. It was a pale yellow oil with a refractive index $n_D^{20}$ 1.5258.

EXAMPLE 9

N-cyclohexyloxymethyl α-chloroacetamide was prepared as in Example 3, but using cyclohexanol instead of methanol. It was a white solid, distilling at 121°/1 mm.; M.P. 46–48°. (Found: Cl, 17.4. $C_9H_{16}ClNO_2$ requires Cl, 17.3%.) O,O-diethyl S-(N-cyclohexyloxymethyl) carbamoylmethyl phosphorothiolothionate was then prepared as in Example 4. It was a colourless oil with a refractive index $n_D^{20}$ 1.5275. It solidified on standing to a white solid melting at 50–51.5°. (Found: P, 8.55. $C_{13}H_{26}NO_4PS_2$ requires P, 8.7%.)

The products of Examples 10–12 were prepared as in Example 2, but using the appropriate alcohol.

EXAMPLE 10

*O,O-diethyl S-(N-isopropoxymethyl) carbamoylmethyl phosphorothiolothionate*

$(C_2H_5O)_2P(S)SCH_2CONHCH_2OCH(CH_3)_2$ $n_D^{20}$ 1.5208.

EXAMPLE 11

*O,O-diethyl S-(N-benzyloxymethyl) carbamoylmethyl phosphorothiolothionate*

$(C_2H_5O)_2P(S)SCH_2CONHCH_2OCH_2C_6H_5$

It was obtained as a yellow oil. (Found: P, 8.5. $C_{14}H_{22}NO_4PS_2$ requires P, 8.5%.)

EXAMPLE 12

*O,O-diethyl S - (N - β - chloroethoxymethyl) carbamoylmethyl phosphorothiolothionate*

$(C_2H_5O)_2P(S)SCH_2CONHCH_2OCH_2CH_2Cl$ $n_D^{20}$ 1.5270.

In examples 13–15 the same method was employed as in Example 2 but O,O-dimethyl potassium phosphorothiolothionate was used instead of the diethyl homologue.

EXAMPLE 13

O,O-dimethyl S-(N-allyloxymethyl) carbamoylmethyl phosphorothiolothionate. $n_D^{20}$ 1.5402.

EXAMPLE 14

O,O-dimethyl S - (N - isopropoxymethyl) carbamoylmethyl phosphorothiolothionate. $n_D^{20}$ 1.5312.

EXAMPLE 15

O,O-dimethyl S-(N-*n*-butoxymethyl) carbamoylmethyl phosphorothiolothionate. $n_D^{20}$ 1.5221.

EXAMPLE 16

O,O-diethyl S-(N-*p*-chlorophenoxymethyl) carbamoylmethyl phosphorothiolothionate $(C_2H_5O)_2P(S)SCH_2CONHCH_2OC_6H_4Cl-p$ 12.35 g. of N-methylol α-chloroacetamide were dissolved with warming in 100 cc. of acetone, and to the solution was added a solution of 22.4 g. of O,O-diethyl potassium phosphorothiolothionate in 50 cc. of acetone. The mixture was heated under reflux for 3 hours, the precipitated potassium chloride was filtered off and the solvent was evaporated under reduced pressure to give O,O-diethyl S-(N-hydroxymethyl) carbamoylmethyl phosphorothiolothionate as a white solid weighing 27.3 g. (theory requires 27.3 g.).

5.46 g. of this compound were shaken with a solution of 2.57 g. of *p*-chlorophenol in 20 cc. of ether containing 0.5 cc. of concentrated hydrochloric acid. Solution was complete after 15 minutes, and the mixture was then allowed to stand overnight at room temperature. It was neutralised with sodium bicarbonate, the mixture was filtered and the solvent removed from the filtrate. The residue was shaken twice with 100 cc. portions of water to remove unchanged p-chlorophenol, and then dissolved in ether. The ether solution was dried over anhydrous sodium sulphate, filtered and the solvent removed from the filtrate. O,O-diethyl S-(N-p-chlorophenoxymethyl) carbamoylmethyl phosphorothiolothionate was obtained as a pale yellow oil weighing 5.1 g. (theory requires 7.67 g.). It has refractive index $n_D^{20}$ 1.5548.

EXAMPLE 17

*O,O-dimethyl S-(N-methoxymethyl) carbamoylmethyl phosphorothiolothionate*

$(CH_3O)_2P(S)SCH_2CONHCH_2OCH_3$ 1560 g. of O,O-dimethyl hydrogen phosphorothiolothionate and 738 g. of N-methylol-α-chloroacetamide were dissolved in 1500 cc. of methanol. 318 g. of anhydrous sodium carbonate were added and the mixture was heated at 50° for 3 hours. The solid which precipitated was filtered off, and 132 cc. of concentrated hydrochloric acid were added to the filtrate, which was then allowed to stand at room temperature for 16 hours. The mixture was neutralised with sodium carbonate, filtered from solid and the solvent was removed from the filtrate under reduced pressure at 50°, giving 1550 g. of O,O-dimethyl S-(N-methoxymethyl) carbamoylmethyl phosphorothiolothionate, which was a yellow oil, $n_D^{20}$ 1.5397 (theory requires 1550 g.).

This product has a very favourable mammalian toxicity. Its acute oral $LD_{50}$ to female mice was 345 mg./kg. body weight. It had particularly good acaricidal and aphicidal contact and systemic sctivities.

It was formulated as follows: 50 parts of the above product were made up to 100 parts by volume with butanol. 10 parts of a wetting agent (an alkylphenol polyoxyethylene condensate) were then added and the solution made up to contain 0.025% of the toxicant. Broad beans infested with aphids were dipped in this mixture and observations made after 48 hours, when it was found that all the aphids on the plants were killed.

A dilution containing 0.0005% of the toxicant gave a complete kill of the Greenhouse Red Spider in a parallel test using dwarf bean plants. Moreover, this material had systemic properties as it was ttaken up from a culture solution into the roots of bean plants and translocated to the leaves of the plants.

*Application on sugar beet.*—In this test the formulated material was diluted to contain 0.08% of the toxicant and sprayed in a commercial sugar beet plantation against aphids. The kill of aphids was very rapid (an observation of the efficiency after 24 hours showed a complete kill of aphids) and the efficiency of the material persisted for about 14 days during which time any reinfestation of aphids was killed off.

*Application on brussels sprouts.*—The compound was applied as a spray at 0.08% of the toxicant to brussels sprouts against mealy cabbage aphids. The aiphids were killed within 24 hours and the plants were kept clean of aphids for 14 days.

*Application on apples.*—The compound was applied as a spray at 0.04% of toxicant against European fruit tree spider mite. A complete kill of all active stages was observed within 2 days. This effect persisted for 3 weeks.

When applied as a spray at 0.02% of toxicant against green apple aphid (*Aphis pomi*) it gave complete kill within 48 hours (on some varieties, e.g. Fortune, within 24 hours) and this effect persisted for 3 weeks.

*Application on hops.*—The compound was applied as a spray at 0.06% of toxicant against aphids on hops. A kill of aphids was observed within 24 hours. Its efficiency persisted for 3 weeks.

EXAMPLE 18

123 g. of N-methylol-α-chloroacetamide were dissolved in 300 cc. of methnol and to the solution were added 20 cc. of concentrated hydrochloric acid. The solution was allowed to stand for 16 hours at room temperature and was then neutralised with sodium carbonate. The mixture was filtered and the solvent was removed from the filtrate at 50° and 20 mm. pressure. To the residue was added a solution of 175 g. of O,O-dimethyl ammonium phosphorothiolothionate in 250 cc. of methanol, and the mixture was heated at 50° for 30 minutes. The precipitated ammonium chloride was filtered off, and the solvent was removed at 50° and 20 mm. pressure, leaving a yellow oil, O,O-dimethyl S-(N-methoxymethyl) carbamoylmethyl phosphorothiolothionate, weighing 259 g. (theory requires 259 g.)

EXAMPLE 19

246 g. of N-methylol-α-chloroacetamide were dissolved in 600 cc. of ethyl alcohol (74 O.P. industrial methylated spirit) and 40 cc. of concentrated hydrochloric acid were added to the solution. After standing for 16 hours at room temperature, the solution was neutralised with sodium carbonate, filtered and the solvent was removed from the filtrate at 50° and 20 mm. pressure. To the thus obtained N-ethoxymethyl-α-chloroacetamide was added a solution of 350 g. of O,O-dimethyl ammonium phosphorothiolothionate in 500 cc. of ethyl alcohol (74 O.P. I.M.S.). The temperature rose to 50°, and after 2½ hours the precipitated ammonium chloride was filtered off. The solvent was removed from the filtrate at 50° and 20 mm. pressure to yield a yellow oil, O,O-dimethyl S-(N-ethoxymethyl) carbamoylmethyl phosphorothiolothionate, weighing 546 g. (theory requires 546 g.), $n_D^{20}$ 1.5353.

The product of Example 19 had an acute oral $LD_{50}$ on female mice of 290 mg./kg. body weight. It was formulated by the method used for the product of Example 17. It had a similar spectrum of insecticidal and acaricidal activity. It was also dissolved in acetone to make a 10% solution and applied as an aerosol against *Aphis fabae* on broad beans. Complete kill of aphis was obtained after 24 hours. When the aerosol was applied to white flies on tomatoes a complete kill of white flies was also obtained after 24 hours.

EXAMPLE 20

To 15.1 g. of N-ethoxymethyl-α-chloroacetamide (prepared as in Example 19) was added a solution of 18.7 g. of O,O-diethyl ammonium phosphorothionate in 100 cc. of ethyl alcohol (74 O.P. industrial methylated spirit). The mixture was heated for 3 hours at 50°, the precipitated ammonium chloride was filtered off and the solvent was removed under reduced pressure. The residue was filtered off from a little ammonium chloride. A pale yellow oil O,O-diethyl O-(N-ethoxymethyl) carbamoylmethyl phosphorothionate

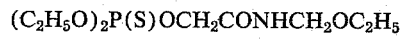

$$(C_2H_5O)_2P(S)OCH_2CONHCH_2OC_2H_5$$

was obtained weighing 28 g. (theory requires 28.1 g.), $n_D^{20}$ 1.4858.

This product was formulated as follows: 50 parts of the above toxicant were mixed with 10 parts of the wetting agent (an alkylphenyl polyoxyethylene condensate) and made up to 100 parts by volume with butanol. It was sprayed at the rate of 38.4 fluid ounces in 100 gallons of water per acre to brussels sprouts against mealy cabbage aphis. A rapid kill of the aphis was obtained and an excellent control of the aphis was obtained up to 14 days after spraying. A good measure of control was achieved up to 24 days.

When applied to sugar beet against aphid an excellent initial kill was obtained and the effect persisted for 15 days.

EXAMPLE 21

4.29 g. of N-methylol-α-chloroacetamide and 7.23 g. of diethyl potassium phosphorothionate were dissolved, with warming, in 100 cc. of acetone, and the solution was allowed to stand for 16 hours at room temperature. The precipitated potassium chloride was filtered off, and the filtrate was heated under reflux for 2 hours. The solution was once again filtered, the acetone was evaporated from the filtrate in vacuo and the residue was dissolved in 100 cc. of methanol. 2 cc. of concentrated hydrochloric acid were added to the solution and the mixture was allowed to stand for two days at room temperature. It was then neutralised with sodium bicarbonate, filtered and the solvent was removed from the filtrate in vacuo. 50 cc. of chloroform were added to the residue and the solution was again filtered. The chloroform was removed leaving a brown oil O,O-diethyl O-(N-methoxymethyl) carbamoylmethyl phosphorothionate, weighing 9.1 g. (theory requires 9.5 g.) $n_D^{20}$ 1.4868.

EXAMPLE 22

O,O - diethyl S-1-(N-ethoxymethylcarbamoyl) ethyl phosphorothiolothionate, $(C_2H_5O)_2P(S)SCH(CH_3)CONHCH_2OC_2H_5$ was prepared as follows:

(A) N-HYDROXYMETHYL-α-CHLOROPROPIONAMIDE 5.37 g. of α-chloropropionamide and 0.1 g. of potassium carbonate were dissolved in 4 cc. of 37.5% solution of formaldehyde in water and the solution was warmed at 60° for 15 minutes. The water was evaporated off in vacuo at room temperature, and the solid residue was recrystallised from benzene. White crystals were obtained, M.P. 71–72°. (Found: Cl, 25.6; $C_4H_8ClNO_2$ requires Cl, 25.8%.)

(B) N-ETHOXYMETHYL-α-CHLOROPROPIONAMIDE 1.37 g. of N-methylol-α-chloropropionamide was dissolved in 10 cc. of ethanol and 0.1 cc. of concentrated hydrochloric acid was added to the solution. The solution was set aside for 16 hours at room temperature, and then neutralised with sodium bicarbonate, filtered and evaporated to dryness in vacuo. The residue was dissolved in acetone and refiltered. After the removal of acetone from the filtrate a pale yellow liquid, weighing 1.4 g. (theory requires 1.65 g.) $n_D^{20}$ 1.4602, was obtained. (Found: Cl, 21.4; $C_6H_{12}ClNO_2$ requires Cl, 21.45%.)

(C)

1.23 g. of N-ethoxymethyl-α-chloropropionamide was dissolved in 10 cc. of acetone, and to the solution was added a solution of 1.66 g. of O,O-diethyl potassium phosphorothiolothionate in 20 cc. of acetone. The mixture was allowed to stand for 2 days. It was then heated under reflux for 7 hours. The precipitated potassium chloride was filtered off, and the solvent was removed, leaving a light brown oil weighing 2.3 g. (theory requires 2.34 g.) $n_D^{20}$ 1.5128.

EXAMPLE 23

O,O-diethyl O - 1 - (N-methoxymethylcarbamoyl) ethyl phosphorothionate $(C_2H_5O)_2P(S)OCH(CH_3)CONHCH_2OCH_3$ was prepared as follows:

1.17 g. of N-methoxymethyl-α-chloropropionamide (prepared by the procedure described for the ethyl homologue in Example 22) was dissolved in 10 cc. of acetone and to the solution was added a solution of 1.48 g. of diethyl sodium phosphorothionate in 50 cc. of acetone. The mixture was heated under reflux for a total period of 48 hours, filtering off the precipitated sodium chloride after each 8 hour period of heating. Removal of the solvent in vacuo gave a light brown oil of weight 2.2 g. (theory requires 2.20 g.) $n_D^{20}$ 1.4640.

EXAMPLE 24

O,O-diethyl S-(N-tetrahydrofurfuryloxymethyl)carbamoylmethyl phosphorothiolothionate

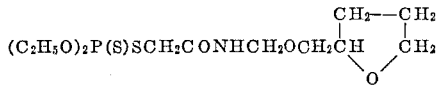

were prepared as follows:

(A) PREPARATION OF N-CHLOROMETHYL-α-CHLOROACETAMIDE

To 12.35 g. of N-methylol-α-chloroacetamide were added 8 cc. of thionyl chloride at room temperature. Hydrogen chloride and sulphur dioxide evolved vigorously. After 15 minutes the excess of thionyl chloride was evaporated off with slight warming under reduced pressure, leaving a white solid which melted at 44–45°. This compound was used directly for further condensation.

(B) N-TETRAHYDROFURFURYLOXYMETHYL-α-CHLOROACETAMIDE 10.2 g. of tetrahydrofurfuryl alcohol dissolved in 50 cc. of dry benzene were added with cooling and stirring to 2.3 g. of finely divided sodium in 100 cc. of dry benzene. The N-chloromethyl-α-chloroacetamide (prepared above) dissolved in 100 cc. of dry benzene was added to the sodium tetrahydrofurfuryl alcoholate, with cooling. The mixture was stirred for 1 hour and the precipitated sodium chloride filtered off. The benzene was removed from the filtrate in vacuo, leaving a brown oil weighing 10.4 g.

(C)

To a solution of 6.92 g. of the above oil in 10 cc. of acetone was added a solution of 0.99 g. of O,O-diethyl potassium phosphorothiolothionate in 10 cc. of acetone. After 16 hours the precipitated potassium chloride was filtered off, and the solvent was removed below 30° in vacuo, yielding a pale yellow oil weighing 1.57 g. (theory requires 1.58 g.) $n_D^{20}$ 1,5235.

(Found: P, 8.1. $C_{12}H_{24}NO_5PS_2$ requires P, 8.5%.)

EXAMPLE 25

$(C_2H_5O)_2P(S)SCH_2CONHCH_2OCH_2CH_2OC_2H_5$

O,O-diethyl S-(N-2-ethoxyethoxymethyl) carbamoylmethyl phosphorothiolothionate was prepared by the method of Example 24 but using β-hydroxyethyl ethyl ether instead of tetrahydrofurfuryl alcohol. It was an oil, $n_D^{20}$ 1.5234.

EXAMPLE 26

O,O-diethyl S-(N-diethylaminoethoxymethyl) carbamoylmethyl phosphorothiolothionate hydrochloride was prepared by the method described in Example 24, but using diethylaminoethanol. It was an oil, $n_D^{20}$ 1,5337.

EXAMPLE 27

*O,O-diethyl S-(N-benzoyloxymethyl) carbamoylmethyl phosphorothiolothionate*

(A) N-BENZOYLOXYMETHYL-α-CHLOROACETAMIDE 14.4 g. of finely powdered sodium benzoate were stirred with 50 cc. of acetone, and to this suspension was added, with water cooling, a solution of 14.2 g. of N-chloromethyl-α-chloroacetamide (prepared as in Example 24B). The mixture was stirred for 30 minutes and the precipitated sodium chloride was filtered off. After the removal of the solvent a brown oil remained weighing 15.0 g. This solidified on standing. On recrystallisation from carbon tetrachloride and then diisopropyl ether, white needles were obtained, M.P. 71.5–72.5°. (Found: Cl, 15.8; N, 6.2. $C_{10}H_{10}ClNO_3$ requires Cl, 15.6; N, 6.1%.

(B)

1.51 g. of the above compound were dissolved in 10 cc. of acetone, and to it was added a solution of 1.49 g. of O,O-diethyl potassium phosphorothiolothionate in 10 cc. of acetone. The mixture was allowed to stand for 16 hours and the precipitated potassium chloride was filtered off. After the removal of the solvent a colourless oil remained weighing 2.40 g. (theory requires 2.50 g.), $n_D^{20}$ 1.5551.

EXAMPLE 28

(A) PREPARATION OF N-(1-HYDROXY-2,2,2-TRICHLOROETHYL-α-CHOLORACETAMIDE 14.75 g. of anhydrous chloral and 4.7 g. of α-chloroacetamide were mixed at room temperature and then refluxed at 100° for 2 hours. The cooled reaction mixture was washed with 2% hydrochloric acid and then filtered. The crystalline solid melted at 140–141° (with decomposition).

(B) PREPARATION OF O,O-DIETHYL O-[N-(1-HYDROXY-2,2,2 - TRICHLORO) - ETHYL]CARBAMOYLMETHYL PHOSPHOROTHIONATE

A mixture of 7.53 g. of the compound from Example 28A and 6.24 g. of O,O-diethyl potassium phosphorothionate in 150 cc. of acetone was refluxed until no more potassium chloride precipitated. The mixture was filtered from the precipitated potassium chloride which was washed with more acetone (theoretical weight of potassium chloride) and the acetone removed from the combined filtrate and washings leaving 11.5 g. of a dark brown oil, $n_D^{20}$ 1.5119.

EXAMPLE 29

(A) PREPARATION OF N-(1-METHOXY-2:2:2-TRICHLOROETHYL α-CHLOROACETAMIDE 4.82 g. of N-(1-hydroxy-2:2:2-trichloroethyl) α-chloroacetamide and 9 cc. of thionyl chloride were refluxed for 1.5 hours until hydrogen chloride ceased evolving. Excess thionyl chloride was distilled off and the residual solid crystallised from ligroin. N-(1:2:2:2-tetrachloroethyl) α-chloroacetamide was obtained as grey needles, weighing 3.6 g. and melting at 75–77°. The above product was then treated with a solution of 0.32 g. of sodium in 25 cc. of methanol. Sodium chloride was filtered, the methanol evaporated and the residue recrystallised from ligroin. The desired compound was obtained as light brown needles melting at 103–104°.

(B) PREPARTION OF O,O-DIETHYL S-[N-(1-METHOXY-2:2:2-TRICHLORO)-ETHYL] CARBAMOYLMETHYL PHOSPHOROTHIOLOTHIONATE

A solution of 1.53 g. of the compound of Example 29A and 1.34 g. of O,O-diethylpotassium phosphorothiolothionate in 70 cc. of acetone was set aside for 16 hours at room temperature and the precipitated potassium chloride filtered off (theoretical amount). On evaporation of the solvent from the filtrate a white solid remained weighing 2.33 g. (theory requires 2.43 g.).

EXAMPLE 30

O,O-diethyl O-[N-(1-methoxy-2:2:2-trichloro) ethyl] carbamoylmethyl phosphorothionate

This compound was prepared by the method of Example 29 except that 1.25 g. of O,O-diethyl potassium phosphorothionate was used and the mixture set aside for 16 hours, then refluxed for 2 hours. A brown oil, $n_D^{20}$ 1.5046 weighing 2.3 g. (theoretical yield) was obtained.

EXAMPLE 31

(A) PREPARATION OF N-(1-DIMETHYLDITHIOCARBAMOYL-2:2:2-TRICHLOROETHYL) α-CHLOROACETAMIDE 2.6 g. of N-(1:2:2:2-tetrachloroethyl) α-chloroacetamide in 16 cc. of acetone were added to a solution of 1.9 g. of sodium dimethyl dithiocarbamate (2½ H₂O) in 8 cc. of water and the mixture shaken for 35 min. The precipitated solid was filtered and washed with water. The desired compound was obtained as a white solid melting at 146.5–147.5° (with decomposition).

(B) PREPARATION OF O,O-DIETHYL S-[N-(1-DIMETHYLDITHIOCARBAMOYL-2:2:2-TRICHLORO) ETHYL] CARBAMOYLMETHYL PHOSPHOROTHIOLOTHIONATE

A mixture of 1.72 g. of the compound of Example 31A and 1.12 g. of O,O-diethyl potassium phosphorothiolothionate in 60 cc. of acetone was allowed to stand at room temperature for 2 days and the precipitated potassium chloride filtered off (theoretical quantity). On evaporating the acetone a viscous, brown oil $n_D^{20}$ 1.5860 was obtained weighing 2.4 g. (theory requires 2.47 g.).

This compound, in addition to being active insecticidally, was also active against *Venturia inaequalis* (apple scab), its LD₉₅ being lower than 10 parts per million.

EXAMPLE 32

(A) PREPARATION OF N-CHLOROMETHYL-α-CHLOROACETAMIDE

To 6.17 g. of N-methylol-α-chloroacetamide were added 4 cc. of thionyl chloride at room temperature. Hydrogen chloride and sulphur dioxide evolved vigorously. After 15 minutes 30 cc. of light petroleum were added and the petroleum and excess of thionyl chloride were evaporated off at room temperature under reduced pressure, leaving a white solid which melted at 44–45°. This compound was unstable and therefore used directly for further condensations.

(B) PREPARATION OF N-(DIMETHYLDITHIOCARBAMOYLMETHYL)-α-CHLOROACETAMIDE

N-chloromethyl-α-chloroacetamide from (A) was dissolved in 50 cc. of acetone. To this solution was added a solution of 9.4 g. of sodium dimethyldithio carbamate (2½ H₂O) in 200 cc. of acetone. The mixture was allowed to stand overnight at room temperature. The precipitated sodium chloride was filtered off (weight equal to theoretical) and the acetone solution evaporated to dryness under reduced pressure. A yellow solid was obtained weighing 10.4 g. (theory requires 11.3 g.). When recrystallised from isopropanol it yielded cream-coloured crystals, melting at 86–88°. (Found: N, 12.7.

requires N, 12.3%.)

(C) CONDENSATION OF N - (DIMETHYLDITHIOCARBAMOYLMETHYL)-α-CHLOROACETAMIDE WITH O,O-DIETHYL POTASSIUM PHOSPHOROTHIOLOTHIONATE TO O,O-DIETHYL S-(N-DIMETHYLDITHIOCARBAMOYLMETHYL) - CARBAMOYLMETHYL PHOSPHOROTHIOLOTHIONATE

2.26 g. of N-(dimethyldithiocarbamoylmethyl)-α-chloroacetamide and 2.24 g. of O,O-diethyl potassium phosphorothiolothionate in 50 cc. of acetone were allowed to stand for 5 hours. The organic layer was then free of chlorine, as determined by the Beilstein test for halogen. The mixture was then filtered to separate the acetone solution from the precipitated potassium chloride. The potassium chloride was washed on the filter with a little more acetone and the acetone distilled off under reduced pressure leaving a viscous oil, $n_D^{20}$ 1.5952 weighing 3.6 g. (theory requires 3.6 g.).

Examples 33–43 describe the preparation of compounds of the general formula:

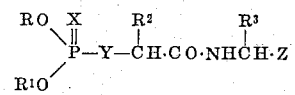

where Z=NR⁵R⁶, R, R¹, X, Y, R², R³, R⁵ and R⁶ have the meaning defined above.

All compounds prepared are salts of hydrochloric acid as they were prepared by the following general procedure:

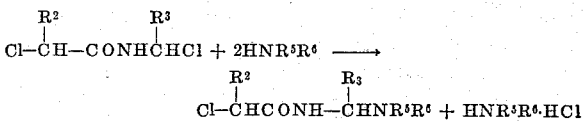

(Where the base was obtained in the free state, it was converted with hydro chloric acid to the hydrochloride; it can, of course, be converted to a different salt.

Then $$\begin{array}{c} RO \\ \diagdown \parallel^X \\ P-YM + ClCH-CONHCH-NR^5R^6 \longrightarrow \\ R'O \diagup \quad \mid R^2 \quad \mid R^3 \end{array}$$

$$\begin{array}{c} RO \\ \diagdown \parallel^X \\ P-Y-CH\cdot CONHCH\cdot NR^5R^6\cdot HCl \\ R'O \diagup \quad \mid R^2 \quad \mid R^3 \end{array}$$

where M is an alkali metal or ammonium.

EXAMPLE 33

O,O - diethyl S - (N - diethylaminomethyl) carbamoylmethyl phosphorothiolothionate hydrochloride $(C_2H_5O)_2P(S)SCH_2CONHCH_2N(C_2H_5)_2 \cdot HCl$ was prepared as follows:

(A) N-DIETHYLAMINOMETHYL-α-CHLOROACETAMIDE HYDROCHLORIDE 12.35 g. of N-methylol-α-chloroacetamide was converted into N-chloromethyl-α-chloroacetamide by the process described in Example 24A, and the product was dissolved in 75 cc. of dry ether. The solution was added, with cooling and stirring, to a solution of 14.2 g. of diethylamine in 100 cc. of dry ether, the temperature being kept between −10° and −5° C. The precipitated diethylamine hydrochloride was filtered off (10.9 g. obtained, theory requires 10.7 g.), and the basic ethereal solution was neutralised with alcoholic hydrochloric acid. The white solid that precipitated was filtered off and weighed 15.8 g. It was very deliquescent and could not be purified by recrystallisation.

(B)

6.45 g. of the product obtained above were dissolved in 15 cc. of methanol and to it a solution of 6.72 g. of O,O-diethyl potassium phosphorothiolothionate in 15 cc. of methanol was added. The precipitated potassium chloride was filtered off and the solvent was removed in vacuo to give a pale yellow oil, which solidified to a white solid. 10.7 g. were obtained (theory requires 10.93 g.).

EXAMPLE 34

O,O-dimethyl S-(N-diethylaminomethyl) carbamoylmethyl phosphorothiolothionate hydrochloride was prepared by the method of Example 33, but using O,O-dimethyl potassium phosphorothiolothionate. It was an oil, $n_D^{20}$ 1.5410.

EXAMPLE 35

O,O-dimethyl O-(N-diethylaminomethyl) carbamoylmethyl phosphorothionate hydrochloride was prepared by the method of Example 33, but using dimethyl potassium phosphorothionate, $n_D^{20}$ 1.5002.

EXAMPLE 36

O,O-diethyl O-(N-diethylaminomethyl) carbamoylmethyl phosphorothionate hydrochloride was prepared by the method of Example 33, but using diethyl potassium phosphorothionate.

EXAMPLE 37

O,O-diethyl S-(N-dimethylaminomethyl) carbamoylmethyl phosphorothiolothionate hydrochloride was prepared by the method of Example 33, but using N-dimethylaminomethyl-α-chloroacetamide hydrochloride and O,O-dimethyl potassium phosphorothiolothionate.

EXAMPLE 38

O,O - diethyl S-(N-ethylaminomethyl) carbamoylmethyl phosphorothiolothionate hydrochloride was prepared by the method of Example 33, but using N-ethylaminomethyl-α-chloroacetamide hydrochloride. It was an oil $n_D^{20}$ 1.5350.

EXAMPLE 39

O,O-diethyl S-(N-methylaminomethyl) carbamoylmethyl phosphorothiolothionate hydrochloride was prepared by the method of Example 33, but using N-methylaminomethyl-α-chloroacetamide hydrochloride. It was an oil, $n_D^{20}$ 1.5463.

EXAMPLE 40

O,O-diethyl S-(N-benzylaminomethyl) carbamoylmethyl phosphorothiolothionate hydrochloride was prepared by the method of Example 33, but using N-benzylaminomethyl-α-chloroacetamide hydrochloride.

EXAMPLE 41

O,O-diethyl S-(N-cyclohexylaminomethyl) carbamoylmethyl phosphorothiolothionate hydrochloride was prepared by the method of Example 33, but using N-cyclohexylaminomethyl-α-chloroacetamide hydrochloride.

EXAMPLE 42

O,O-diethyl S-(N-morpholinomethyl) carbamoylmethyl phosphorothiolothionate hydrochloride was prepared by the method of Example 33, but using N-morpholinomethyl-α-chloroacetamide hydrochloride. It was an oil, $n_D^{20}$ 1.5408.

EXAMPLE 43

O,O-diethyl dithiophosphorylmethyl carbamoylmethyl pyridinium chloride $$(C_2H_5O)_2\overset{S}{\underset{\parallel}{P}}-SCH_2CONHCH_2-\overset{+}{N}\diagdown\diagup \quad Cl^-$$

was prepared as follows:

(A) N-(CHLOROACETAMIDOMETHYL) PYRIDINIUM CHLORIDE 12.35 g. of N-methylol-α-chloroacetamide were converted into N-chloromethyl-α-chloroacetamide by the method described in Example 24A. The product was dissolved in 50 cc. of dry ether and the solution was added to a stirred cooled solution of 7.9 g. of pyridine in 10 cc. of dry ether, the temperature being kept below 0°. A sticky solid was precipitated from the mixture and the solvent was evaporated in vacuo. The product, a deliquescent white solid, was recrystallised from ethanol to give white crystals, M.P. 150°.

(B)

2.21 g. of the material prepared above were dissolved in 30 cc. of ethanol, and to the solution was added a solution of 2.24 g. of O,O-diethyl potassium phosphorothiolothionate in 20 cc. of ethanol. There was an immediate precipitation of potassium chloride. After 16 hours the mixture was filtered and the filtrate evaporated to dryness, yielding 3.7 g. of a viscous yellow oil (theory requires 3.70 g.), $n_D^{20}$ 1.5672.

The following tables list the biological activity of the compounds described.

The compounds were made up as follows:

20 parts of the toxicant were mixed with 30 parts of Lissapol NX (which is a polyethylene glycol ether) and made up to 100 parts by volume with methanol. This solution was diluted with water to the required concentrations.

To evaluate the compounds for their contact aphicidal activity, broad beans infested with aphids were dipped in this mixture, observations were made after 48 hours and mortalities recorded.

To evaluate the compounds for their contact acaricidal activity dwarf beans infested with greenhouse red spider were dipped in the mixture containing the required concentration of toxicant, observations made after 48 hours and mortalities recorded.

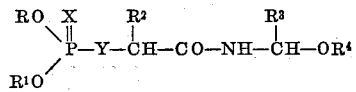

| Example No. | R, R¹ | R² | R³ | R⁴ | X | Y | Greenhouse red spiders Dipping | | Aphids Dipping | | Aphids Culture | |
|---|---|---|---|---|---|---|---|---|---|---|---|---|
| | | | | | | | Conc. (percent) | Kill (percent) | Conc. (percent) | Kill (percent) | Conc. (percent) | Kill (percent) |
| 4 | C₂H₅ | H | H | n—C₄H₉ | S | S | 0.005 | 100 | 0.001 | 100 | 0.0025 | 100 |
| 5 | C₂H₅ | H | H | C(CH₃)₂CH₂COCH₃ | S | S | 0.01 | 98 | 0.01 | 100 | | |
| 7 | C₂H₅ | H | H | C₂H₅ | S | S | 0.0025 | 100 | 0.0005 | 100 | 0.01 | 100 |
| 8 | C₂H₅ | H | H | CH₂—CH=CH₂ | S | S | 0.001 | 100 | 0.001 | 100 | 0.005 | 100 |
| 9 | C₂H₅ | H | H | C₆H₁₁ (cyclohexyl) | S | S | | | | | 0.005 | 100 |
| 10 | C₂H₅ | H | H | CH(CH₃)₂ | S | S | 0.005 | 100 | 0.005 | 100 | 0.01 | 100 |
| 11 | C₂H₅ | H | H | CH₂C₆H₅ | S | S | 0.01 | 100 | 0.01 | 99 | | |
| 12 | C₂H₅ | H | H | C₂H₄Cl | S | S | 0.0025 | 97 | 0.0025 | 99 | | |
| 13 | CH₃ | H | H | CH₂—CH=CH₂ | S | S | 0.0025 | 100 | | | 0.01 | 100 |
| 14 | CH₃ | H | H | CH(CH₃)₂ | S | S | 0.0025 | 100 | | | | |
| 15 | CH₃ | H | H | n—C₄H₉ | S | S | 0.0025 | 100 | | | | |
| 16 | C₂H₅ | H | H | C₆H₄—pCl | S | S | 0.0025 | 100 | 0.005 | 92 | | |
| 21 | C₂H₅ | H | H | CH₃ | S | O | 0.00025 | 100 | 0.001 | 100 | 0.005 | 100 |
| 25 | C₂H₅ | H | H | C₂H₄OC₂H₅ | S | S | 0.0025 | 100 | 0.0025 | 100 | 0.005 | 93 |
| 26 | C₂H₅ | H | H | C₂H₄N(C₂H₅)₂·HCl | S | S | 0.005 | 100 | | | 0.0025 | 100 |
| 27 | C₂H₅ | H | H | COC₆H₅ | S | S | | | 0.01 | 91 | | |
| 28 | C₂H₅ | H | CCl₃ | H | S | O | 0.005 | 100 | 0.01 | 100 | | |
| 30 | C₂H₅ | H | CCl₃ | CH₃ | S | O | 0.01 | 100 | | | | |

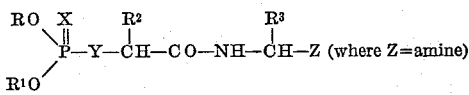

| Example No. | R, R¹ | R² | R³ | Z | X | Y | Greenhouse red spiders Dipping | | Aphids Dipping | | Aphids Culture | |
|---|---|---|---|---|---|---|---|---|---|---|---|---|
| | | | | | | | Conc. (percent) | Kill (percent) | Conc. (percent) | Kill (percent) | Conc. (percent) | Kill (percent) |
| 33 | C₂H₅ | H | H | N(C₂H₅)₂·HCl | S | S | 0.001 | 100 | 0.0025 | 100 | 0.0025 | 100 |
| 34 | CH₃ | H | H | N(C₂H₅)₂·HCl | S | S | 0.005 | 90 | | | 0.0025 | 100 |
| 35 | CH₃ | H | H | N(C₂H₅)₂·HCl | S | O | 0.01 | 88 | | | | |
| 36 | C₂H₅ | H | H | N(C₂H₅)₂·HCl | S | O | 0.005 | 97 | | | | |
| 37 | C₂H₅ | H | H | N(CH₃)₂·HCl | S | S | 0.01 | 100 | 0.01 | 100 | | |
| 38 | C₂H₅ | H | H | NHC₂H₅·HCl | S | S | 0.01 | 99 | 0.01 | 91 | | |
| 39 | C₂H₅ | H | H | NHCH₃·HCl | S | S | 0.01 | 93 | | | | |
| 40 | C₂H₅ | H | H | NHCH₂C₆H₅·HCl | S | S | 0.0025 | 100 | | | | |
| 41 | C₂H₅ | H | H | NHC₆H₁₁·HCl | S | S | 0.005 | 96 | | | 0.0025 | 100 |
| 42 | C₂H₅ | H | H | N—CH₂—CH₂—O, HCl, CH₂—CH₂ | S | S | 0.005 | 92 | | | | |
| 43 | C₂H₅ | H | H | —N⁺C₆H₅Cl⁻ | S | S | 0.01 | 96 | 0.01 | 96 | | |

To evaluate the compounds for systemic activity the following tests were carried out: broad bean plants were placed in culture solutions made up to contain the required concentrations of toxicant, the plants were infested with aphids the same day and observations of mortality were made after 48 hours.

To test the compounds for persistency, broad bean plants infested with aphids were grown for 48 hours in culture solutions made up to contain the required concentrations of toxicant and observations were made of mortality of aphids. The plants were then taken out of the solutions, placed in culture solutions containing no toxicant and infested with aphids on the 2nd day. Observations were then carried out after 24 hours. If the plants were clean of live aphids, the plants were reinfested and observations made again after 24 hours. This procedure was repeated for 7 days by which time the plants were unsuitable for further work.

The following compounds were tested and the following persistency was found by this method:

EXAMPLES OF ETHERS

| Product of Example No. | Concentration of toxicant (percent) | Persistency in days by the above test |
|---|---|---|
| 4 | 0.0025 | 7 |
| 7 | 0.01 | 7 |
| 8 | 0.005 | 7 |
| 9 | 0.005 | 3 |
| 10 | 0.01 | 7 |
| 13 | 0.01 | 7 |
| 17 | 0.005 | 7 |
| 19 | 0.0025 | 7 |
| 21 | 0.005 | 7 |
| 25 | 0.005 | 3 |
| 26 | 0.005 | 3 |

EXAMPLES OF AMINES

| Product of Example No. | Concentration of toxicant (percent) | Persistency in days by the above test |
|---|---|---|
| 33 | 0.005 | 3 |
| 34 | 0.0025 | 4 |
| 41 | 0.005 | 3 |

We claim:
1. A mixture of an insecticidal compound of the formula

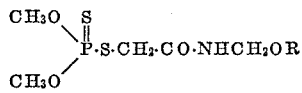

wherein R is alkyl of 1–4 carbons and an acid binding agent selected from the group consisting of an organic nitrogen base and an epoxy compound, said acid binding agent being present in an amount sufficient to improve the stability of said insecticidal compound.

2. The mixture of claim 1 dissolved in a lower alkanol.

References Cited by the Examiner

UNITED STATES PATENTS

| | | | |
|---|---|---|---|
| 2,411,566 | 11/1946 | Evans | 167—42 |
| 2,494,283 | 1/1950 | Cassaday et al. | 260—943 |
| 2,768,181 | 10/1956 | Bellin et al. | 167—42 |
| 2,797,181 | 6/1957 | Drexel | 167—42 |
| 2,959,608 | 11/1960 | Crouch et al. | 260—247.1 |
| 3,092,541 | 6/1963 | Beriger | 167—22 |
| 3,130,120 | 4/1964 | Schultz et al. | 167—42 |
| 3,137,616 | 6/1964 | Maier | 167—22 |

FOREIGN PATENTS

| | | |
|---|---|---|
| 206,446 | 11/1959 | Austria. |
| 845,834 | 8/1960 | Great Britain. |

OTHER REFERENCES

Fusco et al.: Chimicae l'Industria, vol. 42, No. 4, p. 338 (April 1960).

JULIAN S. LEVITT, *Primary Examiner.*

IRVIN MARCUS, MORRIS LIEBMAN, NICHOLAS RIZZO, *Examiners.*

J. W. MOLASKY, F. M. SIKORA, J. TOVAR, G. A. MENTIS, *Assistant Examiners.*